United States Patent
Wu et al.

(10) Patent No.: US 12,348,148 B2
(45) Date of Patent: Jul. 1, 2025

(54) DIRECT-CURRENT-TO-DIRECT-CURRENT CONVERTER WITH TRANSFORMER THERMAL MANAGEMENT

(71) Applicant: Deere & Company, Moline, IL (US)

(72) Inventors: Yuheng Wu, Fargo, ND (US); Tianjun Fu, West Fargo, ND (US); Long Wu, Fargo, ND (US); Dustin E. Oelmann, Fargo, ND (US); Richard E. Wainwright, West Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 241 days.

(21) Appl. No.: 18/360,996

(22) Filed: Jul. 28, 2023

(65) Prior Publication Data

US 2024/0204677 A1   Jun. 20, 2024

Related U.S. Application Data

(60) Provisional application No. 63/476,106, filed on Dec. 19, 2022.

(51) Int. Cl.
*H02M 3/335* (2006.01)
*H02M 1/32* (2007.01)

(52) U.S. Cl.
CPC ....... *H02M 3/33576* (2013.01); *H02M 1/327* (2021.05); *H02M 3/33573* (2021.05)

(58) Field of Classification Search
CPC ......... H02M 3/33573; H02M 3/33576; H02M 3/33583
See application file for complete search history.

(56) References Cited

U.S. PATENT DOCUMENTS

| | | | | |
|---|---|---|---|---|
| 10,749,441 B1 * | 8/2020 | Singh | ................ | H02M 3/33584 |
| 10,804,808 B1 * | 10/2020 | Fu | ..................... | H02M 3/33576 |
| 2019/0089262 A1 * | 3/2019 | Granato | ............ | H02M 3/33592 |

FOREIGN PATENT DOCUMENTS

| | | |
|---|---|---|
| DE | 102017223860 A1 | 9/2019 |
| EP | 3761497 A1 | 1/2021 |

OTHER PUBLICATIONS

Extended European Search Report and Written Opinion issued in European Patent Application No. 23207640.6 dated May 2, 2024, in 07 pages.

(Continued)

*Primary Examiner* — Gary A Nash

(57) ABSTRACT

An electronic controller is configured to adjust the duty cycle, between a respective pairs of semiconductor switches of the primary converter of a direct-current-to-direct-current converter based on reducing or minimizing one or more of the first estimated line-to-line DC offset voltage, the second estimated line-to-line DC offset voltage, and the third estimated line-to-line DC offset voltage. Further, the electronic controller is configured determines duty cycle adjustments based on oversampling (e.g., enhanced data processing with interpolation) of smoothed or integrated representation of the first estimated line-to-line DC offset voltage, the second estimated line-to-line DC offset voltage, and the third estimated line-to-line DC offset voltage.

11 Claims, 8 Drawing Sheets

(56) References Cited

OTHER PUBLICATIONS

J. Voss et al., "Control Method for Avoiding Transformer Saturation in High-Power Three-Phase Dual-Active Bridge DC-DC Converters," in IEEE Transactions on Power Electronics, vol. 35, No. 4, pp. 4332-4341, Apr. 2020, doi: 10.1109/TPEL.2019.2938585.
G. Ortiz et al., "Application of the magnetic ear for flux balancing of a 160kW/20kHz DC-DC converter transformer," 2013 Twenty-Eighth Annual IEEE Applied Power Electronics Conference and Exposition (APEC), 2013, pp. 2118-2124.
N. M. L. Tan et al., "Design and Performance of a Bidirectional Isolated DC-DC Converter for a Battery Energy Storage System," in IEEE Transactions on Power Electronics, vol. 27, No. 3, pp. 1237-1248, Mar. 2012, doi: 10.1109/TPEL.2011.2108317.
S. A. Assadi et al., "Active Saturation Mitigation in High-Density Dual-Active-Bridge DC-DC Converter for On-Board EV Charger Applications," in IEEE Transactions on Power Electronics, vol. 35, No. 4, pp. 4376-4387, Apr. 2020, doi: 10.1109/TPEL.2019.2939301.
Erickson et al., Fundamentals of Power Electronics. Norwell, Mass: Kluwer Academic, 2001.

\* cited by examiner

DIRECT-CURRENT-TO-DIRECT-CURRENT CONVERTER WITH TRANSFORMER THERMAL MANAGEMENT

RELATED APPLICATION

This document (including the drawings) claims priority and the benefit of the filing date based on U.S. application No. 63/476,106, filed Dec. 19, 2022, under 35 U.S.C. § 119(e), where the provisional application is hereby incorporated by reference herein.

FIELD

This disclosure related to a direct-current (DC)-to-direct-current (DC) converter with transformer thermal management, such as duty-cycle compensation to reduce or eliminate transformer saturation.

BACKGROUND

In some prior art, a transformer of a dual active bridge DC-to-DC converter may have a primary converter that is susceptible to introducing a specious DC voltage offset or low frequency offset to the primary winding, which can induce currents to flow in the core between the primary winding and the secondary winding. The induced currents can contribute to saturation of the magnetic flux of the core of the transformer. In turn, the maximum power rating or maximum current transfer of the transformer can be vulnerable to or reduced by the induced currents, which are dissipated as thermal energy or heat in the core. Therefore, there is a need for a DC to DC converter with transformer thermal management.

SUMMARY

In accordance with one aspect of the disclosure, a dual-active-bridge converter comprises a primary converter that has a plurality of primary switch pairs that operate at different phases or phase offsets with respect to each other. Each primary switch pair comprises a first switched terminal of low-side semiconductor switch that is coupled to a corresponding second switched terminal of high-side semiconductor switch at a primary alternating current node. Each primary switch pair comprises the low-side semiconductor switch that has a second switched terminal coupled to one terminal of a primary direct current bus. The high-side semiconductor switch has a first switched terminal coupled to another terminal of the primary direct current bus.

A secondary converter has a plurality of secondary switch pairs that operate at different phases or phase offsets with respect to each other. Each secondary switch pair comprises a first switched terminal of low-side semiconductor switch that is coupled to a corresponding second switched terminal of high-side semiconductor switch at an secondary alternating current node. Each secondary switch pair comprising the low-side semiconductor switch that has a second switched terminal coupled to one terminal of a secondary direct current bus. The high-side semiconductor switch has a first switched terminal coupled to another terminal of the secondary direct current bus.

A first DC offset detector is configured to measure a first observed DC offset line-to-line voltage, associated with the primary alternating current nodes, between a first respective phase and a second respective phase. A second DC offset detector is configured to measure a second observed DC offset line-to-line voltage, associated with the primary alternating current nodes, between a third respective phase and the second respective phase. An estimator or summer is configured for determining or estimating a third estimated line-to-line DC offset voltage based upon a difference between the first observed line-to-line DC offset voltage and the second line-line DC offset voltage.

A transformer coupled between the primary alternating current node and the secondary alternating current node.

Under one aspect of the disclosure, an electronic controller is configured to provide control signals to the control terminals of the semiconductor switches of the primary converter and the secondary converter based on a commanded current or target output current. Further, the electronic controller is configured to adjust the duty cycle, between a respective pairs of semiconductor switches (e.g., pair comprising a low-side semiconductor switch and high-side semiconductor switch of the same phase) of the primary converter (e.g., and optionally the second converter) based on reducing or minimizing one or more of the first estimated line-to-line DC offset voltage, the second estimated line-to-line DC offset voltage, and the third estimated line-to-line DC offset voltage.

Under another aspect to the disclosure, an electronic controller determines duty cycle adjustments based on oversampling (e.g., enhanced data processing with interpolation) of smoothed or integrated representation of the first estimated line-to-line DC offset voltage, the second estimated line-to-line DC offset voltage, and the third estimated line-to-line DC offset voltage

DETAILED DESCRIPTION

In any of the above referenced drawings of this document, any arrow or line that connects any blocks, components, modules, multiplexers, sensors, switches, diodes, memory, data storage, data processors, electronic components, oscillators, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

In one embodiment, the system and method disclosed in this document may comprise a computer-implemented system, method or converter in which one or more data processors process, store, retrieve, and otherwise manipulate data via data buses and one or more data storage devices (e.g., data storage device or memory) as described in this document and the accompanying drawings. As used in this document, "configured to, adapted to, or arranged to" mean that the data processor, converter or controller is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in any other drawing in this disclosure. Alternately, separately from or cumulatively with the above definition, "configured to, adapted to, or arranged to" can mean that the converter comprises one or more components described herein as software modules, equivalent electronic hardware modules, or both to execute any referenced functions, logic operations, mathematical operations, calculations, determinations, processes, methods, algorithms, subroutine.

Figure 1A:
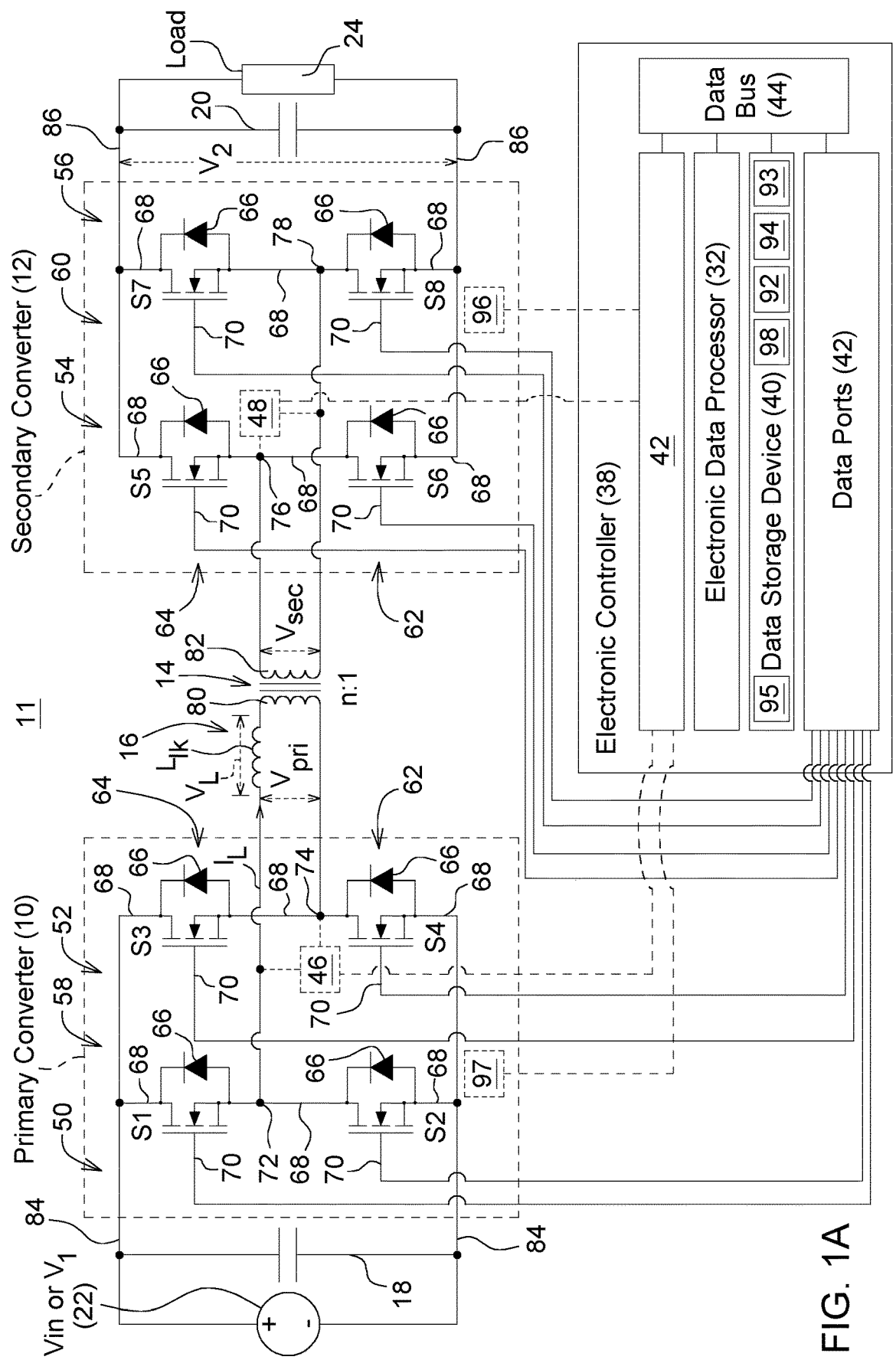
FIG. 1A is a schematic diagram of one embodiment of a direct-current-to-direct-current-converter that comprises a primary full bridge converter coupled to a secondary full bridge converter via a transformer.

In accordance with one embodiment, FIG. 1A illustrates a system of controlling a direct-current (DC) to direct-current (DC) converter for improved thermal efficiency. In FIG. 1A, a primary converter 10 comprises first pair 50 of primary switches and a second pair 52 of primary switches coupled between direct current input terminals 84 of the primary converter 10. A secondary converter 12 comprises a first pair 54 of secondary switches and second pair 56 of secondary switches coupled between direct current (output) terminals 86 of the secondary converter. The first pair 54 of secondary switches may also be referred to as a third pair of semiconductor switches (S5, S6) within the DC-to-DC converter 11; similarly the second pair 56 of secondary switches may be referred to as a fourth pair of semiconductor switches (S7, S8) within the DC-to-DC converter 11. A transformer 14 (e.g., isolation transformer) is coupled between the primary converter 10 and the secondary converter 12. A primary winding 80 of the transformer 14 is coupled to output terminals of the first pair 50 and second pair 52 of primary switches and secondary winding 82 of the transformer 14 is coupled to output terminals of the secondary switches 60. A load 24 (e.g., direct-current load) is arranged for coupling to the direct current (output) terminals 86; wherein an electronic controller 38 is configured to provide time-synchronized control signals to the control terminals of the primary switches 58 and secondary switches 60 to control the converter 11 or system to operate at a modulation frequency (e.g., pulse width modulation frequency).

In one embodiment, one or more voltage measurement devices (46, 48) are configured to measure an observed input voltage and observed output voltage to determine an operational load ratio or operational load percentage between the observed power transfer and maximum power transfer. Because the measurement devices (46, 48) are optional in some configurations, the measurement devices are illustrated in dashed lines.

In one configuration, an electronic data processor 32 or electronic controller 38 is configured to select a load curve based on the determined operational load ratio or percentage. Further, the electronic data processor 32 or electronic controller 38 is configured to adjust or maintain the modulation frequency (e.g., pulse width modulation (PWM)) of the primary converter 10 and the secondary converter 12 consistent with an operation point on the selected load curve, where the operation point minimizes the power loss or thermal energy dissipated from the direct-current-to-direct current converter 11.

FIG. 1A is a schematic diagram of one embodiment of a direct-current-to-direct-current converter 11 ("DC-to-DC converter" or "DC-DC converter") that comprises a primary full bridge 10 coupled to a secondary full bridge 12 via a transformer 14. A primary full bridge 10 comprises first pair 50 of primary switches and a second pair 52 of primary switches. The first pair 50 of primary switches is coupled between direct current (DC) primary terminals 84 (e.g., input terminals) of the primary full bridge 10; the second pair 52 of primary switches 58 is coupled between DC primary terminals 84 (e.g., input terminals) of the primary full bridge 10. The first pair 52 and second pair 58 of primary switches may be referred to as an H-bridge.

In one embodiment, the DC-to-DC converter 11 comprises a single phase, dual-active bridge DC-to-DC converter with DC primary terminals 84 (e.g., DC input terminals) at the primary full bridge 10 and DC secondary terminals 86 (e.g., DC output terminals) at the secondary full bridge 12, where the DC-to-DC converter 11 may operate unidirectionally or bidirectionally (e.g., to transfer electrical power or energy from the input to the output of the converter 11, or vice versa).

Each pair of primary switches 58 comprises a low-side switch 62 and a high-side switch 64. Similarly, each pair of secondary switches 60 comprises a low-side switch 62 and a high-side switch 64. Each switch (58, 60) has switched terminals 68 that are controlled by a control terminal 70. For example, if the switch is a field effect transistor, such as a metal oxide semiconductor field effect transistor (MOSFET) (e.g., Silicon Carbide MOSFET), the switched terminals 68 comprise a source and drain terminal and the control terminal 70 comprises a gate terminal. In one configuration, for each pair of primary switches 58, the switched terminals 68 of the low-side switch 62 are coupled in series to the switched terminals 68 of the high-side switch 64 between the DC primary terminals 84. As illustrated in FIG. 1A, each switch has a protective diode 66 coupled in parallel to the switched terminals 68 of the respective switch. In one embodiment, the switches (58, 60) may comprise silicon carbide field effect transistors or other wide-band-gap semiconductor devices.

In the primary full bridge 10, the switched terminals 68 of the first pair 50 of low-side switch 62 and the high-side switch 64 are coupled together at a first node 72 or first junction associated with a primary alternating current signal. In the primary full bridge 10, the switched terminals 68 of the second pair 52 of low-side switch 62 and the high-side switch 64 are coupled together at a second node 74 or second junction associated with the primary alternating current signal.

A secondary full bridge 12 comprises a third pair (S5, S6) of switches (e.g., secondary switches 60) and a fourth pair (S7, S8) of switches (e.g., secondary switches 60) coupled between DC secondary terminals 86 (e.g., output terminals) of the secondary full bridge 12. The third pair (S5, S6) of switches (e.g., secondary switches 60) is coupled between direct current secondary terminals (e.g., output terminals) of the secondary full bridge 12; the fourth pair (S7, S8) of switches (e.g., secondary switches 60) is coupled between DC secondary terminals 86 (e.g., output terminals) of the secondary full bridge 12.

Each pair of secondary switches 60 comprises a low-side switch 62 and a high side switch 64. Each secondary switch 60 has switched terminals 68 that are controlled by a control terminal 70. For example, if the switch is a field effect transistor, such as a metal oxide semiconductor field effect transistor (MOSFET) (e.g., silicon carbide MOSFET devices), the switched terminals 68 comprise a source and drain terminal and the control terminal 70 comprises a gate terminal. As illustrated in FIG. 1A, each secondary switch 60 has a protective diode 66 coupled in parallel to the switched terminals 68 of the respective switch.

In the DC-to-DC converter 11 in one illustrative configuration, each diode 66 facilitates current dissipation associated with the respective switch (58, 60), to which the diode 66 is coupled in parallel, to reduce transient voltages across the switch (e.g., during a prior turn-off, prior deactivation or prior dead-time of the switch in preparation) for the next turning on of the switch, or next activating of the switch (58, 60). In one embodiment, the protective diodes 66 may be composed gallium nitride diodes or other semiconductor materials.

In the secondary full bridge 12, the switched terminals 68 of the third pair (S5, S6) of low-side switch 62 and the high-side switch 64 are coupled together at a third node 76 or third junction associated with a secondary alternating current signal. In the secondary full bridge 12, the switched terminals 68 of the fourth pair (S7, S8) of low-side switch 62 and the high-side switch 64 are coupled together at a fourth node 78 or fourth junction associated with the secondary alternating current signal.

In one embodiment, a transformer 14 is coupled between the primary full bridge 10 and the secondary full bridge 12. For example, a primary winding 80 of the transformer 14 is coupled to a first node 72 (e.g., first output terminal) of the first pair 50 and the second node 74 (e.g., second output terminal) of second pair 52 of primary switches 58. Similarly, a secondary winding 82 of the transformer 14 is coupled to a third node 76 (e.g., third output terminal) of the third pair (S5, S6) and a fourth node 78 (e.g., fourth output terminal) of the fourth pair (S7, S8) of switches (e.g., secondary switches 60).

The transformer 14 has at least one primary winding 80 and at least one secondary winding 82, where a transformer 14 ratio (n) represents a voltage ratio between the primary terminals and the secondary terminals, or between the primary winding and the secondary winding. For example, the primary winding 80 ratio may represent the number of relative turns (n) of the primary winding 80 to the secondary winding 82. The voltage ratio or winding ratio (turn ratio) may depend upon the winding configuration, the conductor configuration, and the configuration of any core, such as ferromagnetic core, a ferrite core, or an iron core.

In one embodiment, an inductor or variable inductor 16 is coupled in series with the primary winding 80 of the transformer. In an alternate embodiment, the variable inductor is associated with a set of discrete inductors that can be connected, via a set of switches, in series, in a parallel, or both, to achieve an adjustable aggregate inductance. For example, the controller 38 or data processor 32 can control or adjust the variable inductor, or its associated switches, to tune the transformer 14 for the target modulation frequency (e.g., of a pulse width modulation (PWM) signal) to minimize power loss, power difference or thermal dissipation of the converter 11.

An energy source 22 (e.g., battery, capacitor, or generator output) is coupled to the direct current (DC) primary terminals 84 (e.g., input terminals). A load 24 (e.g., active or passive load) is configured to be coupled to the direct current (DC) secondary terminals 86 (e.g., output terminals). However, the DC-to-DC converter 11 that comprises the primary full bridge 10, the secondary full bridge 12 and the transformer 14 can operate bi-directionally, such as where the electrical energy is transferred in either direction between the DC primary terminals 84 and the DC secondary terminals 86. In one direction, the energy source 22 at the DC primary terminals 84 can power a load 24 at the DC secondary terminals 86. However, in the opposite direction, the load 24 at the DC secondary terminals 86 can provide excess or transient energy to the DC primary terminals 84 to charge the energy source 22. As illustrated, a capacitor, such as a primary capacitor 18 is placed across the DC primary terminals 84 and a secondary capacitor 20 is placed across the DC secondary terminals 86, where the primary capacitor 18 and the secondary capacitor 20 are used for filtering (e.g., to reduce noise, such as voltage ripple in the DC voltage).

In certain embodiments, the DC primary terminals 84 are configured to operate at a different voltage level than the DC secondary terminals 86. In other embodiments, the DC primary terminals 84, the DC secondary voltage levels can have variable voltage levels that can fluctuate with the load 24 or operating conditions on a dynamic basis for each time interval (e.g., sampling time of DC voltage observed at the DC primary input and DC secondary output terminals of the converter). For example, the DC primary terminals 84 operate at a higher voltage level or higher voltage range (e.g., approximately 400 VDC to approximately 800 VDC) than a lower voltage level or lower voltage range (e.g., approximately 12 VDC to approximately 400 VDC) the DC secondary terminals 86. Accordingly, the electronic assembly or DC-to-DC converter 11 supports a vehicle with different DC bus levels that are isolated from each other because the transformer blocks DC energy from passing through between transformer primary and transformer secondary.

In one embodiment, an electronic data processor 32, such as an electronic controller 38, is configured to provide time-synchronized control signals to the control terminals 70 of the primary switches 58 and secondary switches 60 to control the converter 11 to operate efficiently in a first control mode 26, a second control mode 28, or a third control mode 30 (in FIG. 7), wherein the first control mode 26 comprises a phase-shift mode, the second control mode 28 comprises a triangular waveform control mode and wherein the third control mode 30 comprises a trapezoidal waveform control mode.

In one embodiment, an electronic controller 38 comprises an electronic data processor 32, a data storage device 40, and one or more data ports 42 coupled to or in communication with a data bus 44. The electronic data processor 32, the data storage device 40, and one or more data ports 42 may communicate data messages between each other via the data bus 44.

The electronic data processor 32 comprises a microcontroller, a microprocessor, a programmable logic array, a logic device, an arithmetic logic unit, a digital signal processor, an application specific integrated circuit or another device for processing or manipulating data. The data storage device 40 comprises electronic memory, nonvolatile random-access memory, magnetic storage device, an optical storage device, or another device for storing, retrieving and managing data, files, data structures or data records. The data ports 42 may comprise an input/output port, a data transceiver, a wireline transceiver, a wireless transceiver, buffer memory, or a combination of the foregoing items.

In one embodiment, the electronic data processor 32 or its data ports 42 are connected to or in communication with the control terminals 70 of the switches (e.g., primary switches 58 and the secondary switches 60) of the primary full bridge 10 and the secondary full bridge 12. Accordingly, the electronic controller 38 can control the timing and operation of each switch, such as activation time, deactivation time, biasing and other aspects. In one embodiment, the electronic controller 38 or electronic data processor 32 uses a fixed switching frequency of fundamental frequency (e.g., within an operational range of switching frequencies) of the switches for multiple or all modulation modes, such as the first mode, the second mode and the third mode. Further, the switches can operate with a same or substantially similar fixed duty cycle (e.g., 50 percent duty cycle plus or minus ten percent tolerance) for multiple or all modulation modes, such as the first mode, the second mode and the third mode. In some configurations, the peak magnitude and duration of the gate signal of the high-side switch 64 and low-side switch 62 of any pair or phase will generally be equal or substantially equivalent.

Although the DC primary terminals 84 (e.g., DC primary bus) and the DC secondary terminals 86 (e.g., DC secondary bus) have fixed voltage levels, the primary voltage (V1) at (or across) the transformer primary winding 80, or the secondary voltage (V2) at (or across) the transformer secondary winding 82, or both can vary.

In one embodiment, a first voltage sensor 46 (e.g., primary voltage sensor) is configured to measure the primary voltage (e.g., root-mean-squared voltage, peak voltage or other alternating current voltage measurement) and a second voltage sensor 48 (e.g., secondary voltage sensor) is configured to: (a) measure the observed primary and secondary voltages (e.g., root-mean-squared voltage, peak voltage or other alternating current voltage measurement) and (b) provide the measurements observed voltage readings of the primary voltage and secondary voltage (e.g., at the transformer terminals of the primary winding and secondary winding) to the electronic controller 38 via one or more data ports 42. In another embodiment, the first voltage sensor 46 and the second voltage sensor 48 may measure one or more of the following: alternating current (AC) voltage levels, root-mean-squared (RMS) voltage levels, or rectified alternating current (e.g., via a half-wave or full-wave bridge rectifier) at one or more transformer windings (80, 82). Further, the electronic controller 38 or electronic data processor 32 is configured to estimate the DC primary voltage at the DC primary (input) terminals 84 and the DC secondary voltage at the DC secondary (output) terminals 86 of the converter 11 based on the measurements, or can control the switches in an initialization mode or test mode to facilitate direct measurement of the primary voltage at the DC primary (input) terminals 84 and the secondary voltage at the DC secondary (output) terminals 86 of the converter.

Alternately, (e.g., during initialization mode or operational mode) the first voltage sensor 146 (in FIG. 1B) and the second voltage sensor 148 (in FIG. 1B) are configured to: (a) measure the primary voltage at the DC primary (input) terminals 84 and the secondary voltage at the DC secondary (output) terminals 86 of the converter 11, and (b) provide the measurements to the electronic controller 38 via one or more data ports 42. Accordingly, the observed primary voltage and the observed secondary voltage can be or are applied to one or more transferred power equations that apply to the respective control mode to estimate the maximum transferred power for each control mod, among other things.

Figure 1B:
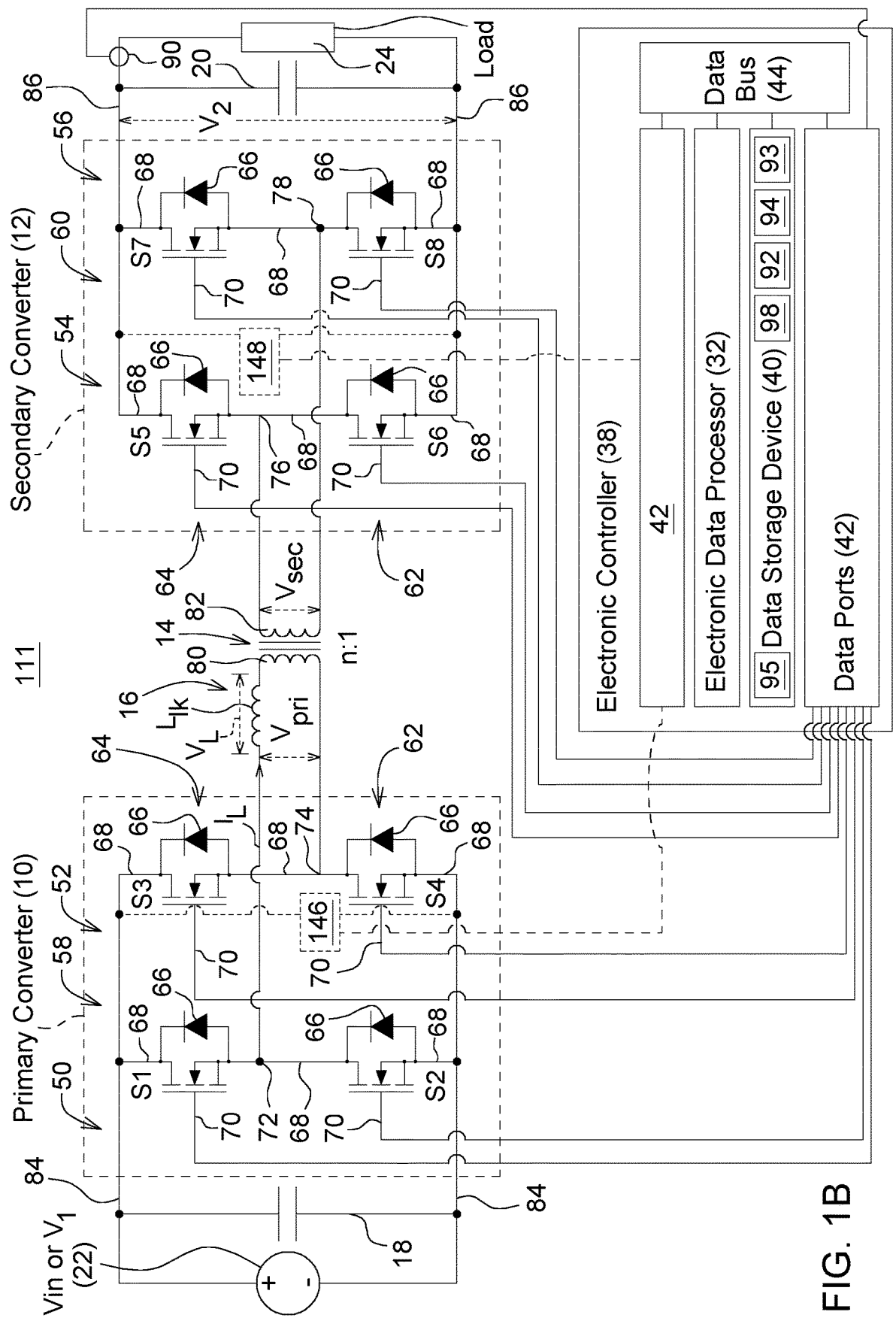
FIG. 1B is a schematic diagram of another embodiment of a direct-current-to-direct-current-converter that comprises a primary full bridge converter coupled to a secondary full bridge converter via a transformer.
Figure 4:
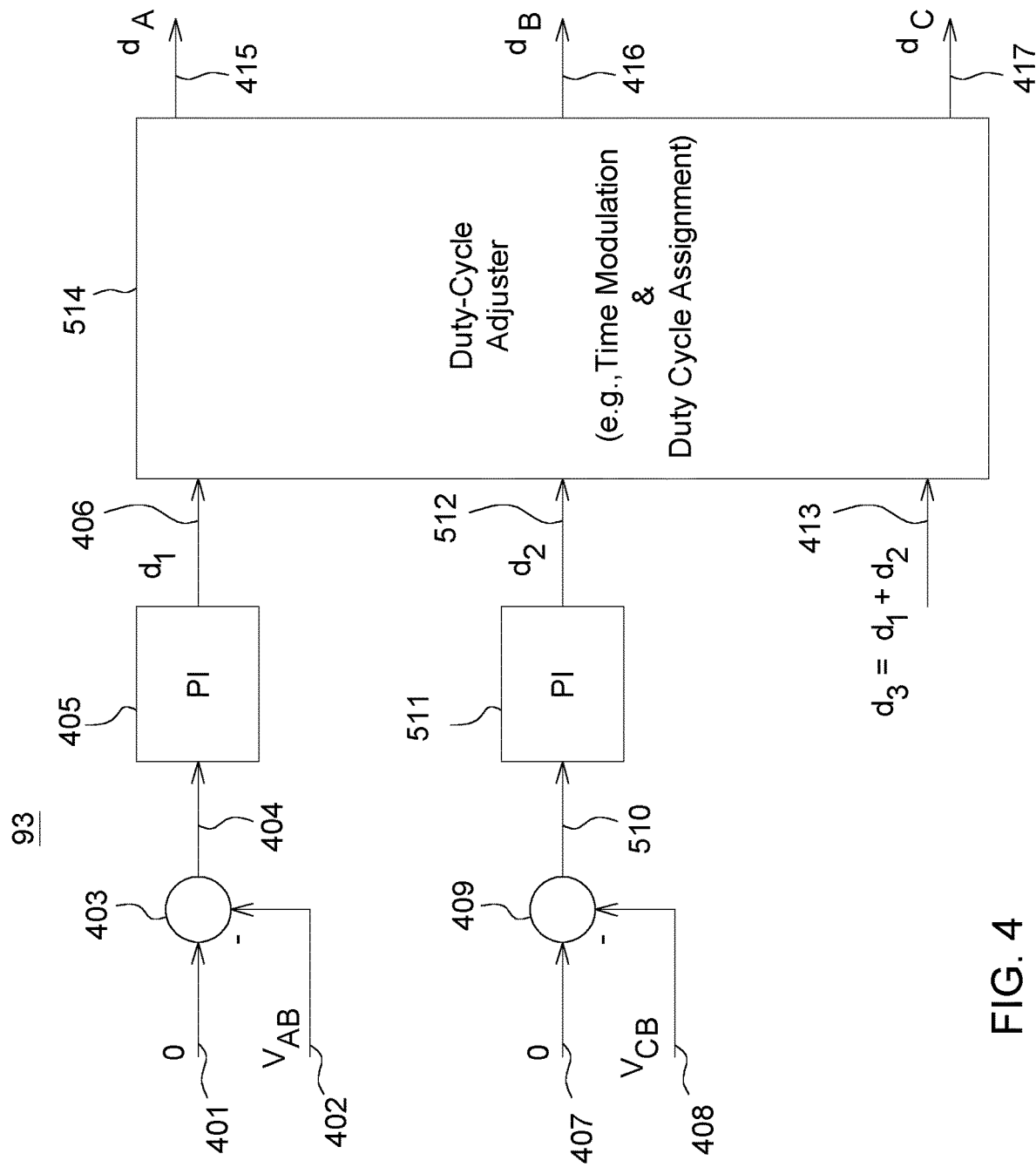
FIG. 4 is a block diagram of one embodiment of a system for determining time modulation (e.g., time division multiplex) of potentially variable duty cycle based on one or more line-to-line voltages of the DC-to-DC converter.

FIG. 1B is similar to FIG. 1A, except the first voltage sensor 46 and the second voltage sensor 48 of FIG. 1A are replaced by the first voltage sensor 146 and the second voltage sensor 148 of FIG. 1B. For example, the readings by a first voltage sensor 146 and a second voltage sensor 148 can be applied to the equations set forth in this document that call for the DC primary voltage (V1 or Vin) at terminals 84 or DC secondary voltage (V2 or Vout) at terminals 86, where Vin and Vout are illustrated in FIG. 4. In an alternate embodiment, the first voltage sensor 146 or the second voltage sensor 148 may be omitted if the DC primary voltage (V1) is fixed or regulated within a certain tolerance and the second voltage sensor 148 may be omitted if the DC secondary voltage (V2) is fixed or regulated within a certain tolerance (e.g., in accordance with design-specifications).

Figure 1C:
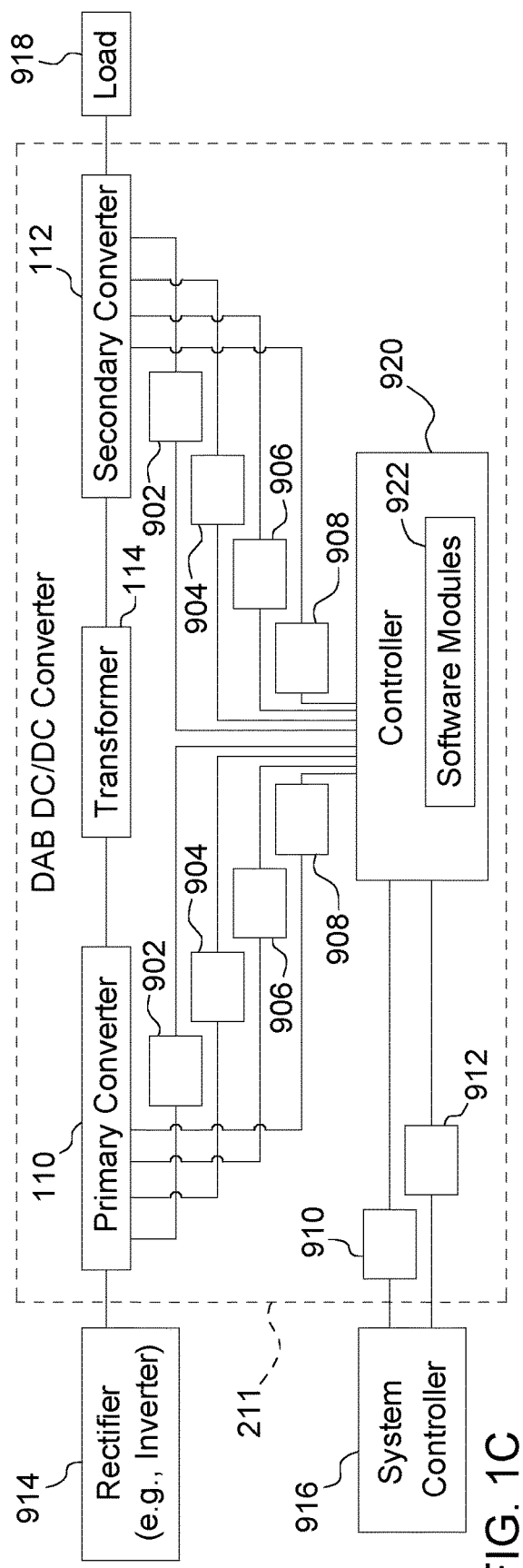
FIG. 1C is a schematic diagram of yet another embodiment of a direct-current-to-direct-current-converter that comprises a primary full bridge converter coupled to a secondary full bridge converter via a transformer with three phase windings.

FIG. 1C is a block diagram of one embodiment of a direct-current-to-direct-current converter 211 that comprises a primary full bridge converter 110 coupled to a secondary full bridge converter 112 via a transformer 114. Like reference numbers in FIG. 1B and FIG. 1C indicate like elements or features.

In FIG. 1C, the dual-active bridge DC-DC converter 211 comprises a primary converter 110 and a secondary converter 112 coupled to a transformer 114. The input of the primary converter 110 may be associated with an energy source, such as a battery pack, an ultracapacitor, or a rectifier 914 (e.g., bidirectional inverter) that rectifies alternating current power generated by an electric machine (e.g., alternator), or from the electrical grid. The secondary output of the secondary converter 112 is coupled to a load 918.

In FIG. 1C, an electronic controller 920 is coupled to the primary converter 110 and the secondary converter 112. The electronic controller 920 has one or more software modules 922, such as a duty-cycle control module 93, a current measurement module 92, a voltage measurement module 94, and a temperature compensation module 95, which are described in conjunction with FIG. 1A and FIG. 1B. The duty-cycle control module 93 may comprise a line-to-line voltage estimator and duty-cycle adjuster 514.

In one embodiment, the primary converter (10, 110, 410) comprises a (gate or switch) driver (98, 902) and one or more of the following sensors: a temperature sensor (96, 904), a voltage sensor (46, 146, 906) and a current sensor (90, 908). Meanwhile, the secondary converter (12, 112, 412) comprises a (gate or switch) driver (98, 902) and one or more of the following sensors: a temperature sensor (97, 904), a voltage sensor (48, 148, 906), and a current sensor (90, 908).

The electronic controller 920 is coupled to a system controller 916 that can communicate via a vehicle data bus 910 (e.g., controller are network (CAN) data bus) and a battery management system data bus 912.

Figure 1D:
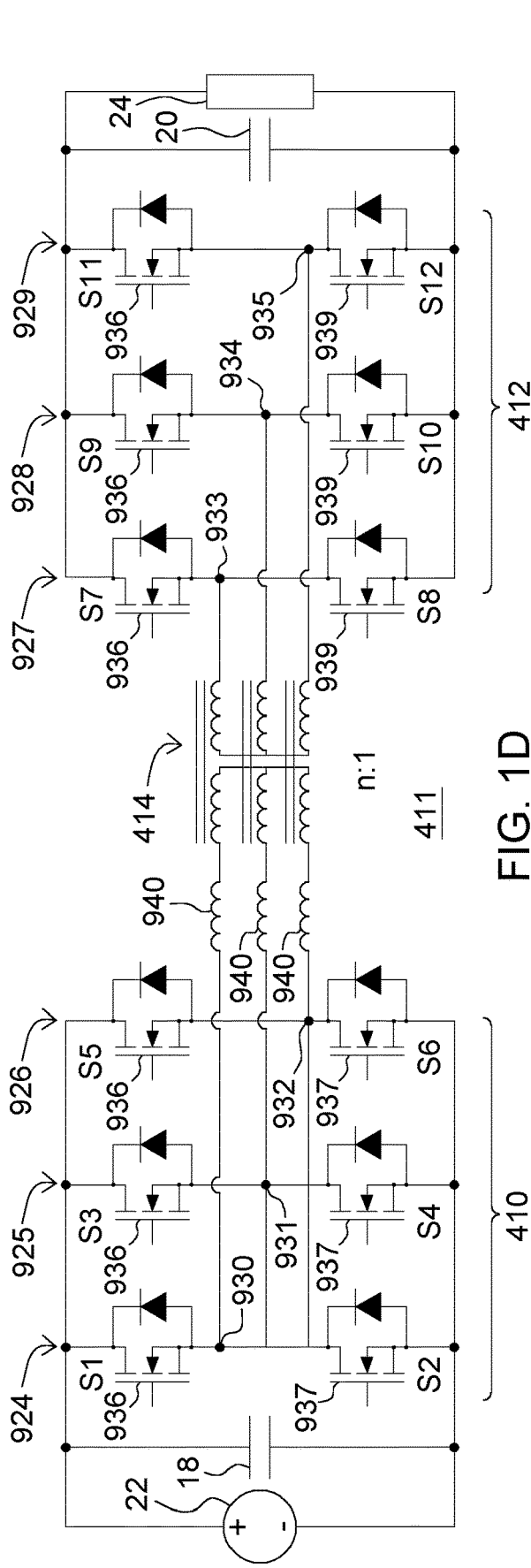
FIG. 1D is a schematic diagram of still another embodiment of a direct-current-to-direct-current converter that comprises a primary full bridge converter coupled to a secondary full bridge converter via a transformer with three phase windings.

FIG. 1D is a schematic diagram of another embodiment of a direct-current-to-direct-current converter 411 that comprises a primary full bridge converter 410 coupled to a secondary full bridge converter 412 via a transformer 414 with three-phase windings. The DC-to-DC converter 411 of FIG. 1D is similar to the DC-to-DC converter (11, 111) of FIG. 1A and FIG. 1B that featured a full-bridge primary converter (10, 110), a full-bridge secondary converter (12, 112), and a single phase transformer (14, 114), except the DC-DC converter 411 of FIG. 1D has a three-phase primary converter 410, a three phase secondary converter 412 and transformer 414 with three-phase windings.

In FIG. 1D, the DC terminals of the primary converter 410 are coupled to the primary capacitor 18 and an energy source 22, such as a battery. Each phase (924, 925, 926) or half bridge of primary converter 410 comprises pair of a low-side semiconductor switch 937 and a high-side semiconductor switch 936. For example, the first phase 924 or first half bridge comprises the pair of semiconductor switches (S1 and S2); the second phase 925 or second half bridge comprises the pair of semiconductor switches (S3 and S4); the third phase 926 or third half bridge comprises the pair of semiconductor switches (S5 and S6). The primary converter 410 has three primary alternating-current (phase) nodes (930, 931, 932) or alternating current (AC) terminals. Each AC (phase) node is coupled to the primary windings of the transformer 414 via integral inductances 940 (e.g., leakage inductances or similar discrete inductors). In certain embodiments, the integrate inductances 940 are suitable to facilitate the transfer of energy from the primary converter 410 to the secondary converter 412; henceforth, to the load 24

The secondary AC phase nodes (933, 934, 935) of the secondary converter 412 (e.g., rectifier) are coupled to respective pairs of low-side semiconductor switches 939 and high-side semiconductor switches 938. For example, the first phase 927 comprises the pair of semiconductor switches (S7 and S8); the second phase 928 comprises the pair of semiconductor switches (S9 and S10); the third phase 929 comprises the pair of semiconductor switches (S11 and S12). The DC terminals of the secondary converter 412 are coupled to the secondary capacitor 20 and the load 24. The electronic controller of FIG. 1A, FIG. 1B, or FIG. 1C can be configured to or adapted to provide control signals to the control terminals of all three phases of the semiconductor switches of FIG. 1D.

Duty Cycle Adjustment or Management

In accordance with one aspect of the disclosure, a dual-active-bridge converter comprises a primary converter (10, 110, 410) that has a plurality of primary switch pairs (68, 936, 937, 939) that operate at different phases or phase offsets with respect to each other. Each primary switch pair comprises a first switched terminal of low-side semiconductor switch (S2, S4, S6) that is coupled to a corresponding second switched terminal of high-side semiconductor switch (S1, S3, S5) at a primary alternating current node. Each primary switch pair comprises the low-side semiconductor switch (S2, S4, S6) that has a second switched terminal coupled to one terminal of a primary direct current bus (e.g., 84). The high-side semiconductor switch (S1, S3, S5) has a first switched terminal coupled to another terminal of the primary direct current bus (e.g., 84).

A secondary converter (12, 112, 412) has a plurality of secondary switch pairs that operate at different phases or phase offsets with respect to each other. Each secondary switch pair comprises a first switched terminal of low-side semiconductor switch (S8, S10, S12) that is coupled to a corresponding second switched terminal of high-side semiconductor switch (S7, S9, S11) at an secondary alternating current node. Each secondary switch pair comprises the low-side semiconductor switch (S8, S10, S12) that has a second switched terminal coupled to one terminal of a secondary direct current bus (e.g., 86). The high-side semiconductor switch (S7, S9, S11) has a first switched terminal coupled to another terminal of the secondary direct current bus (e.g., 86).

Figure 3:
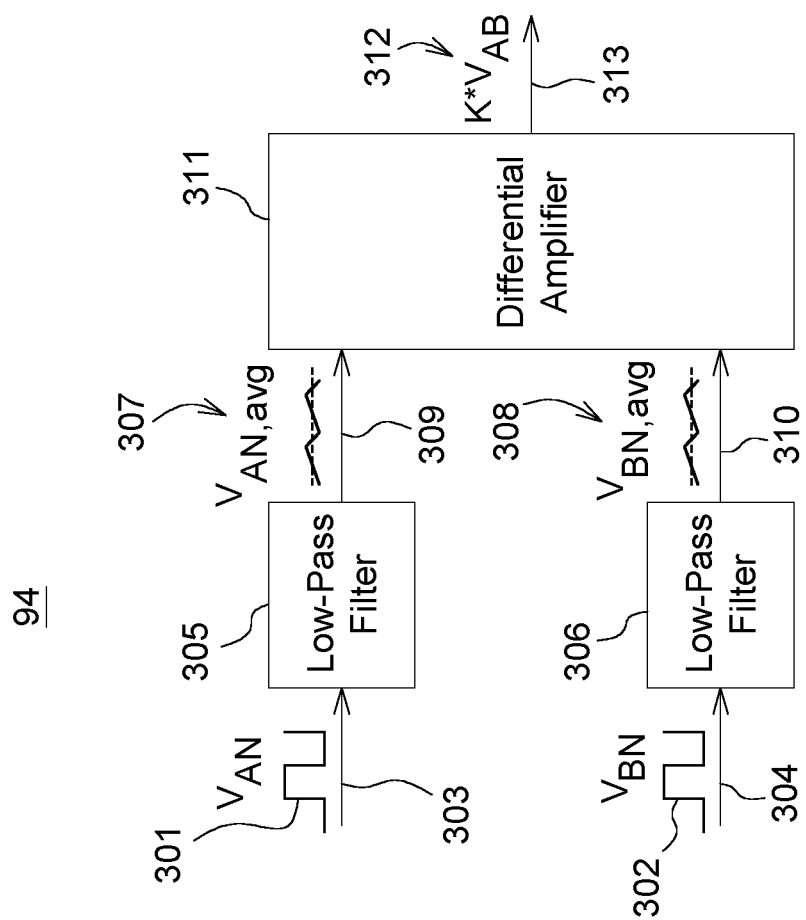
FIG. 3 is a block diagram of one embodiment of a system for determining one illustrative or exemplary line-to-line voltage of the DC-to-DC converter.

In one embodiment, a voltage measurement module 94 comprises a first DC offset detector and a second DC offset detector. A first DC offset detector is configured to measure a first observed DC offset line-to-line voltage, associated with the primary alternating current nodes, between a first respective phase and a second respective phase. A second DC offset detector is configured to measure a second observed DC offset line-to-line voltage, associated with the primary alternating current nodes, between a third respective phase and the second respective phase. An estimator or summer is configured for determining or estimating a third estimated line-to-line DC offset voltage based upon a difference between the first observed line-to-line DC offset voltage and the second line-line DC offset voltage. FIG. 3 illustrates one possible embodiment of a voltage measurement module 94 in greater detail.

A transformer (14, 114, 414) is coupled between the primary alternating-current node and the secondary alternating-current node.

In one embodiment, the electronic controller is configured to provide control signals to the control terminals of the semiconductor switches of the primary converter and the secondary converter based on a commanded current or target output current. Further, the electronic controller is configured to adjust the duty cycle, between a respective pairs of semiconductor switches (e.g., pair comprising a low-side semiconductor switch and high-side semiconductor switch of the same phase) of the primary converter (e.g., and optionally the second converter) based on reducing or minimizing one or more of the first estimated line-to-line DC offset voltage, the second estimated line-to-line DC offset voltage, and the third estimated line-to-line DC offset voltage.

The electronic controller, electronic data processor or the duty-cycle adjuster module 514 is configured to determine one or more duty-cycle adjustments for each phase based on oversampling of a smoothed or integrated representation of the first estimated line-to-line DC offset voltage, the second estimated line-to-line DC offset voltage, and the third estimated line-to-line DC offset voltage. For example, the electronic controller, electronic data processor, or duty-cycle adjuster module 514 is configured to determine one or more duty-cycle adjustments for each phase based on oversampling at a supplemental rate of a smoothed or integrated representation of the first estimated line-to-line DC offset voltage, the second estimated line-to-line DC offset voltage, and the third estimated line-to-line DC offset voltage. Further, first estimated line-to-line DC offset voltage, the second estimated line-to-line DC offset voltage, and the third estimated line-to-line DC offset voltage are provided at a preliminary rate of the first controller and the second controller, which may comprise one or more proportional integral controllers, where the supplemental rate is greater than the preliminary rate.

In one embodiment, an electronic controller (39, 920) comprises an electronic data processor 32, a data storage device 40, and one or more data ports 42 coupled to or in communication with a data bus. The electronic data processor, the data storage device, and one or more data ports 42 may communicate data messages between each other via the data bus 44. The electronic data processor (e.g., 32) comprises a microcontroller, a microprocessor, a programmable logic array, a logic device, an arithmetic logic unit, a digital signal processor, an application specific integrated circuit, a system on a chip, a system on a module, or another device for processing or manipulating data. The data storage device (e.g., 40) comprises electronic memory, nonvolatile random-access memory, magnetic storage device, an optical storage device, or another device for storing, retrieving and managing data, files, data structures or data records. The data ports (e.g., 42) may comprise an input/output port, a data transceiver, a wireline transceiver, a wireless transceiver, buffer memory, or a combination of the foregoing items.

Figure 2:
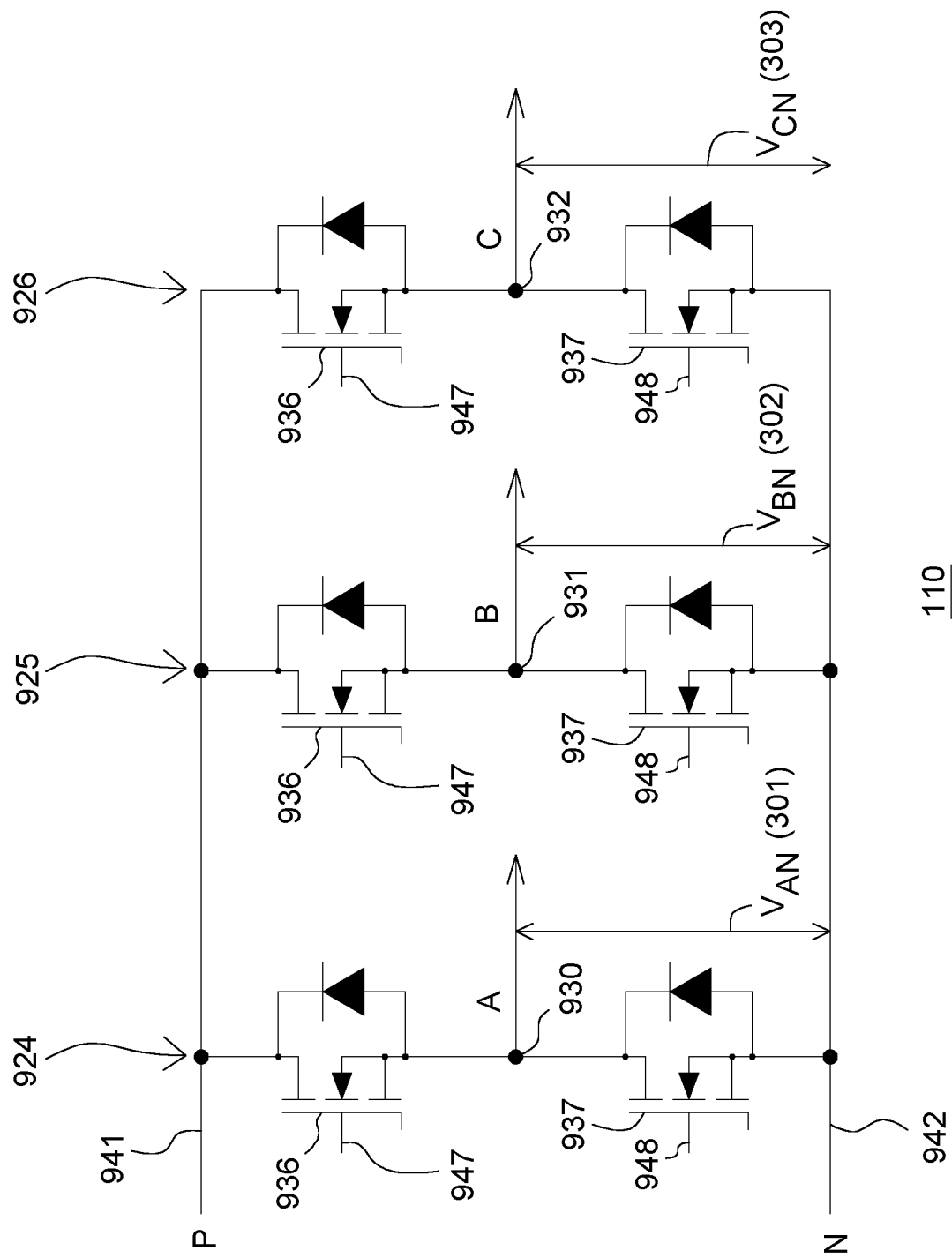
FIG. 2 is a schematic of one embodiment of a primary converter of a DC-to-DC converter that illustrates the alternating current voltage outputs at respective alternating-current output nodes.

FIG. 2 is a schematic of one embodiment of a primary converter 411 of a DC-to-DC converter that illustrates the alternating-current voltage outputs at respective alternating-current (output) nodes (930, 931, 932). The first alternating-current voltage signal 301 for the first phase (e.g., first half bridge) or phase A (924) relative to the negative DC bus (N, 942) can be referred to as $V_{AN}$; the second alternating-current voltage signal 302 for the second phase (e.g., second half bridge or phase B (925) relative to the negative DC bus (N, 942) can be referred to as $V_{BN}$; that third-alternating current voltage 315 for the third phase or phase C (926) relative to the negative DC bus (N, 942) can be referred to as $V_{CN}$. The high-side switches 936 have switched terminals coupled to the positive DC bus terminal (P, 941) and the low-side switches 937 have switched terminals coupled to the negative DC bus terminal (N, 942). The high-side switches 936 receive control signals (e.g., PWM signals with compensating pulse width adjustments to reduce or cancel DC voltage error or DC offset voltage, or near-DC offset voltage) at control terminals 947. The low-side switches 937 receive control signals (e.g., PWM signals with compensating pulse width adjustments to reduce or cancel DC voltage error or DC offset voltage, or near-DC offset voltage) at control terminals 948.

In FIG. 3 in one embodiment, the first DC offset detector comprises a first low-pass filter 305 that is configured to receive the first alternating-current voltage signal 301 (e.g., $V_{AN}$) from a first alternating current node (930 in FIG. 2) for a first respective phase. The first-alternating current voltage signal 301 is inputted at terminal signal 303 of the first low-pass filter 305 and is outputted as an averaged, alternating-current voltage signal 307 (e.g., $V_{AN,avg}$) at terminal 309.

A second low-pass filter 306 is configured to receive the second alternating-current voltage signal 302 from a second alternating current node (931 in FIG. 2) for a second respective phase. The second alternating-current voltage signal 302 is inputted at terminal 304 of the second low-pass filter 306 and is outputted as an averaged, alternating-current voltage signal 308 (e.g., $V_{AN,avg}$) at terminal 310.

A differential amplifier 311 is coupled to the outputs (309, 310) of the first low-pass filter 305 and the second low-pass filter 306; the differential amplifier 311 provides a line-to-line DC offset voltage signal 312, such as a first line-to-line voltage ($K*V_{AB}$, where K is the gain of the differential amplifier), at its output terminal 313.

In one embodiment, a second DC offset detector is similar to the first DC offset detector illustrated in FIG. 3, except the first and second low pass filters (305, 306) are replaced by third and fourth low pass filters that feed a second differential amplifier similar to differential amplifier 311. The second DC offset detector comprises third low-pass filter that is configured to receive the second alternating current voltage at a second alternating current node for a second respective phase. A fourth low-pass filter is configured to receive the third alternating current voltage (e.g., $V_{CN}$) at a third alternating-current node 932 for a third respective phase. A second differential amplifier is coupled to the outputs of the third low-pass filter and the fourth low-pass filter, the second differential amplifier providing the second line-to-line DC offset voltage ($K*V_{CB}$, where K is the gain of the differential amplifier).

In FIG. 4 in one configuration, the electronic controller (38, 920) comprises a duty-cycle control module 93; the duty-cycle control module 93 comprises a first summer 403, a second summer 409, a first controller 405 (e.g., first proportional integral controller), a second controller 511 (e.g., a second proportional integral controller) and a duty-cycle adjuster 514 (e.g., time-modulation and duty-cycle assignment module). The first summer 403 is configured or adapted to receive: (a) a negative input 402 of the first line-to-line DC offset voltage 312 (e.g., $V_{AB}$ or $K*V_{AB}$), and (b) another input 401 to the first summer 403 as a reference or target zero line-to-line DC offset voltage ("0").

A second summer 409 is configured or adapted to receive: (a) a negative input 408 of the second line-to-line DC offset voltage (e.g., $V_{CB}$ or $K*V_{CB}$) and (b) another input 407 to the second summer 409 as a reference or target zero line-to-line DC offset voltage ("0").

The first controller 405 is configured to receive a first error voltage signal at terminal 404 from the first summer 403. In one embodiment, the first controller 405 may comprise a proportional integral control module that provides feedback to adjust a control signal (e.g., a first duty cycle adjustment (d1) or a duty cycle adjustment relative to a current control signal, which could be set to baseline duty cycle of approximately 50%) as an output that is proportional to a linear combination of the input (e.g., voltage error) and the time integral of the input (e.g., voltage error). Further, the feedback can be used to correct the control signals provided by the driver (98, 902) to the control terminals (70, 947, 948) of switches of the DC-to-DC converter (11, 111, 211, 411), such as a (line-to-line) first target duty cycle adjustment (d1), with respect to the control signals, which corresponds to, or that is proportional to, the voltage error. For example, the output comprises a first target duty cycle adjustment (d1) that is proportional to the error (e.g., voltage error) that is superimposed on a ramp obtained by integrating the input.

The first controller 405 is configured to integrate the inputted voltage error over time, which yields a smoothed waveform representing the voltage error. In one embodiment, the first target duty cycle adjustment (d1) (or any sample of a sequence of the d2 adjustments), or the complete duty cycle that includes the first target duty cycle adjustment (e.g., complete duty cycle means the baseline duty cycle plus duty cycle adjustment, d1) is proportional to the instantaneous samples of the voltage error in the smoothed waveform or integrated waveform.

The second controller 511 is configured to receive a second error voltage signal at terminal 510 from the second summer 409. In one embodiment, the second controller 511 may comprise a proportional integral control module that provides feedback to adjust a control signal (e.g., line-to-line second duty cycle adjustment (d2) or a duty cycle adjustment relative to a current control signal) as an output that is proportional to a linear combination of the input (e.g., voltage error) and the time integral of the input (e.g., voltage error).

The second controller 511 is configured to integrate the inputted voltage error over time, which yields a smoothed waveform representing the voltage error. In one embodiment, the second target duty cycle adjustment (d2) (or any sample of a sequence of the d2 adjustments), or the complete duty cycle that includes the first target duty cycle adjustment (e.g., the complete duty cycle means the baseline duty cycle plus duty cycle adjustment, d2) is proportional to the instantaneous samples of the voltage error in the smoothed waveform or integrated waveform. The first target duty cycle adjustment defines a line-to-line duty cycle adjustment between two different phases of the DC-to-DC converter, such as between phase A and phase B.

Further, the feedback can be used to correct the control signals provided by the driver (98, 902) to the control terminals (70, 947, 948) of switches of the DC-to-DC converter (11, 111, 211, 411), such as a (line-to-line) second target duty cycle adjustment (d2), with respect to the control signals, which are proportional to the error voltage error. For example, the output comprises a (line-to-line) second target duty cycle adjustment (d2) that is proportional to the error (e.g., voltage error) that is superimposed on a ramp obtained by integrating the input. The second target duty cycle adjustment defines a line-to-line duty cycle adjustment between two different phases of the DC-to-DC converter, such as between phase C and phase B.

An adder, summer, digital logic or arithmetic logic of the electronic data processor 32 is configured to determine or to calculate the (line-to-line) third duty cycle adjustment (d3) based on adding the (line-to-line) first duty cycle adjustment (d1) to the (line-to-line) second duty cycle adjustment (d2) for any given sampling interval. In one embodiment, the (line-to-line) third target duty cycle adjustment (d3) (or any sample of a sequence of the d3 adjustments), or the complete duty cycle that includes the third target duty cycle adjustment (e.g., the complete duty cycle means the baseline duty cycle plus duty cycle adjustment, d3) is proportional to the instantaneous samples of the voltage error in the smoothed waveform or integrated waveform. The third target duty cycle adjustment defines a line-to-line duty cycle adjustment between two different phases of the DC-DC converter, such as between phase A and phase C.

In one embodiment, the sampling frequency of the first controller 405 and the second controller 511 is 1/N of the fundamental switching frequency (e.g., 100 KHz) of the DC-to-DC converter (11, 111, 211, 411), where N is the number of phases (e.g., three phases as illustrated in FIG. 1D) of the DC-to-DC converter (11, 111, 211, 411). The time slot duration is inversely proportional to the sampling frequency. Once per each sampling frame (e.g., time slot duration multiplied by the number of phases, N. or the number of switches), the duty-cycle adjuster 514 (e.g., time modulation and duty-cycle assignment) will provide a duty cycle sequence for all phases (e.g., phase A, phase B, and Phase C) based on the calculated d1, d2, and d3; each duty cycle adjustment can be provided in a corresponding time slot to respective phase or one or more switches. However, the driver (98, 902) can apply the duty cycle adjustment (e.g., to the baseline duty cycle of approximately 50 percent) per timeslot within with recurring update sequences for all phases and their switches more rapidly than the sampling frame period (e.g., over-updated, oversampled) on a high resolution basis, commensurately with the switching frequency per timeslot, rather than the sampling frequency of 1/N of the fundamental frequency of the first controller 405 and the second controller 511.

The first controller 405 and the second controller 511 are coupled to the duty-cycle adjuster module 414 at terminals (406, 512). In one embodiment, the duty cycle adjuster 514 (e.g., time modulation and duty-cycle assignment module) is configured to provide (e.g., an independent, unique or dynamic) duty-cycle adjustment to each corresponding phase of the primary converter that differs from an approximately fifty percent duty cycle. For example, the duty-cycle adjuster 514 is configured to provide a dynamic duty cycle adjustment (e.g., of differential information to a standard duty cycle or baseline duty cycle based on a duty cycle adjustment) in a corresponding time slot on a time-division multiplex basis for each corresponding phase of the primary converter (10,110, 410) that differs from a standard or baseline duty cycle (e.g., an approximately fifty percent duty cycle). Each duty cycle adjustment (e.g., or pair of duty cycle adjustments) is provided to a respective pair of switches (e.g., pair of high-side and low side switches for the same phase) during a respective time slot among successive time slots that are provided in a recurring rotational sequence that provides a control signal to the control terminal (70, 947, 948) of each switch with a minimum time slot duration that is based on the clock speed of the electronic data processor 32.

For instance, a time slot duration or interval can be within a range of approximately 10 nanoseconds to approximately 10 microseconds based on certain commercially available electronic data processors, where time slots or encoded data for each respective time slot modulate the fundamental switching frequency pursuant to pulse-width modulation (PWM).

In accordance with one embodiment, in a time-division-multiplex system a pulse with a variable pulse width (e.g., PWM where the maximum pulse width is equal to or less than the time slot duration), the duty-cycle adjustment (e.g., per phase) may be transmitted within a fixed time slot, which represents a channel and which is interleaved with other channels, where a channel can be dedicated to duty-cycle adjustment updates or communications of control signals, via the driver (98, 902), for each phase or each switch of the DC-to-DC converter (11, 111, 211, 411). The duty cycle adjustment (e.g., duty cycle compensation to eliminate the DC voltage error, DC offset or DC bias) is added to the baseline duty cycle (e.g., 50 percent duty cycle) on a time-division multiplex basis to provide an updated duty cycle that is determined based on the ratio of the updated pulse width or updated pulse duration to the total period of the waveform. The interleaved channels or time slots can form a frame corresponding to a frame sampling period. In one configuration, the baseline duty cycle can be transmitted in accordance with standard PWM (e.g., space vector PWM or sinusoidal PWM), such that only the duty-cycle adjustment or differential information is transmitted in accordance with the time-division multiplex scheme.

The phases of the primary converter are illustrated in FIG. 2, as a first phase 924, a second phase 925 and third phase 927; where the first phase 924 can be referred to as phase A; the second phase 925 can be referred to as phase B; the third phase 926 can be referred to as phase C.

The duty-cycle control module 93, the duty-cycle adjuster 514 or the data processor 32 is configured to make or output one or more unitary phase or phase specific duty-cycle adjustments (dA, dB, dC) that are referenced properly to phase A, phase B, and phase C for a corresponding sampling interval. For example, the duty-cycle adjuster 514 determines phase specific duty-cycle adjustments (dA, dB, dC) based on inputs available from the first controller 405 and the second controller 511, such as duty-cycle adjustments d1, d2, d3, or smoothed representations (e.g., time integral representations) of the foregoing duty cycle adjustments that result from time integration of estimated voltage errors (e.g., the first, second and third line-to-line voltage errors). Based on the line-to-line duty-cycle adjustments (406, 512, 413), which are also referred to as d1, d2, and d3, the duty-cycle adjuster 514 outputs the phase specific duty cycle adjustments (dA, dB and dC) at respective terminals (415, 416, 417), which are coupled to the driver (98, 902). In turn, the driver (98, 902) is coupled to the control terminals (70, 947, 948) of the switches (68, 936, 937) of primary converter (10, 110, 210, 410) of the DC-to-DC converter (11, 111, 211, 411).

The duty-cycle adjuster 514 supports oversampling or other data processing that supports sufficient resolution for practical duty cycle adjustments. For example, the electronic controller (38, 920), electronic data processor 32, duty-cycle control module 93, or the duty-cycle adjuster 514 can oversample or process the instantaneous samples of voltage error in the smoothed waveform or the corresponding first target duty cycles that are proportional to the instantaneous sample which are available from the second controller 511, which are available from the first controller 405. Here, oversampling or enhanced data processing refers to the preliminary sampling rate of the first controller 405 that is lower than then a supplemental sampling rate (e.g., oversampling by the cycle control module 93 or duty-cycle adjuster module) of the duty-cycle control module 93, or the duty-cycle adjuster 514. For example, if the preliminary sampling rate, by the first controller 405, is the switching frequency divided by N, where N is the number of phases, the supplemental sampling rate, by the module 514, can be equal to or greater than twice the preliminary sampling rate such as twice the switching frequency divided by N. Accordingly, the oversampling tends to improve the resolution of the adjustment to the duty cycle to compensate for any DC voltage error or DC offset that otherwise would tend to contribute to potential saturation of the transformer (14, 114, 414) or potentially reduced power handling of the transformer (e.g., of a given size, weight or footprint).

Similarly, the electronic controller (38, 920), electronic data processor 32, duty-cycle control module 93, or the duty-cycle adjuster 514 can oversample or process the instantaneous samples of voltage error in the smoothed waveform or the corresponding second target duty cycles that are proportional to the instantaneous sample, which are available from the second controller 511. Here, oversampling or enhanced data processing refers to the preliminary sampling rate of the second controller 511 that is lower than then a supplemental sampling rate of the duty-cycle control module 93, or the duty-cycle adjuster 514. For example, if the preliminary sampling rate, by the second controller 511, is the switching frequency divided by N, where N is the number of phases, the supplemental sampling rate, by the duty-cycle adjuster module 514, (e.g., oversampling by the duty-cycle control module 93 or duty-cycle adjuster 514) can be equal to or greater than twice the preliminary sampling rate such as twice the switching frequency divided by N. Accordingly, the oversampling tends to improve the resolution of the adjustment to the duty cycle to compensate for any DC voltage error or DC offset that otherwise would tend to contribute to potential saturation of the transformer (14, 114, 414) or potentially reduced power handling of the transformer (e.g., of a given size, weight or footprint).

The driver (98, 902) data processor 32 or electronic controller (38, 920), or duty cycle adjuster 514, or duty cycle control module 93 can provide a duty cycle adjustment or adjust the duty cycle in accordance with various techniques, which may be applied separately or cumulatively. Under a first technique, as illustrated in FIG. 5, the duty-cycle adjustment, by the duty cycle control module 93 or duty cycle adjuster 514, can comprise or entail decreasing the duty-cycle of the low-side switch below approximately 50 percent duty cycle (e.g., 50%–dA), while simultaneously increasing the duty cycle of the high-side switch above approximately 50 percent duty cycle (e.g., 50%+dA) for a corresponding phase (e.g., phase A) of the primary inverter to attenuate any direct current or low frequency current flowing between the primary winding and secondary winding of the transformer (e.g., that would otherwise saturate the transformer magnetic flux (B field component) and degrade thermal performance of maximum power rating of the transformer).

Figure 5:
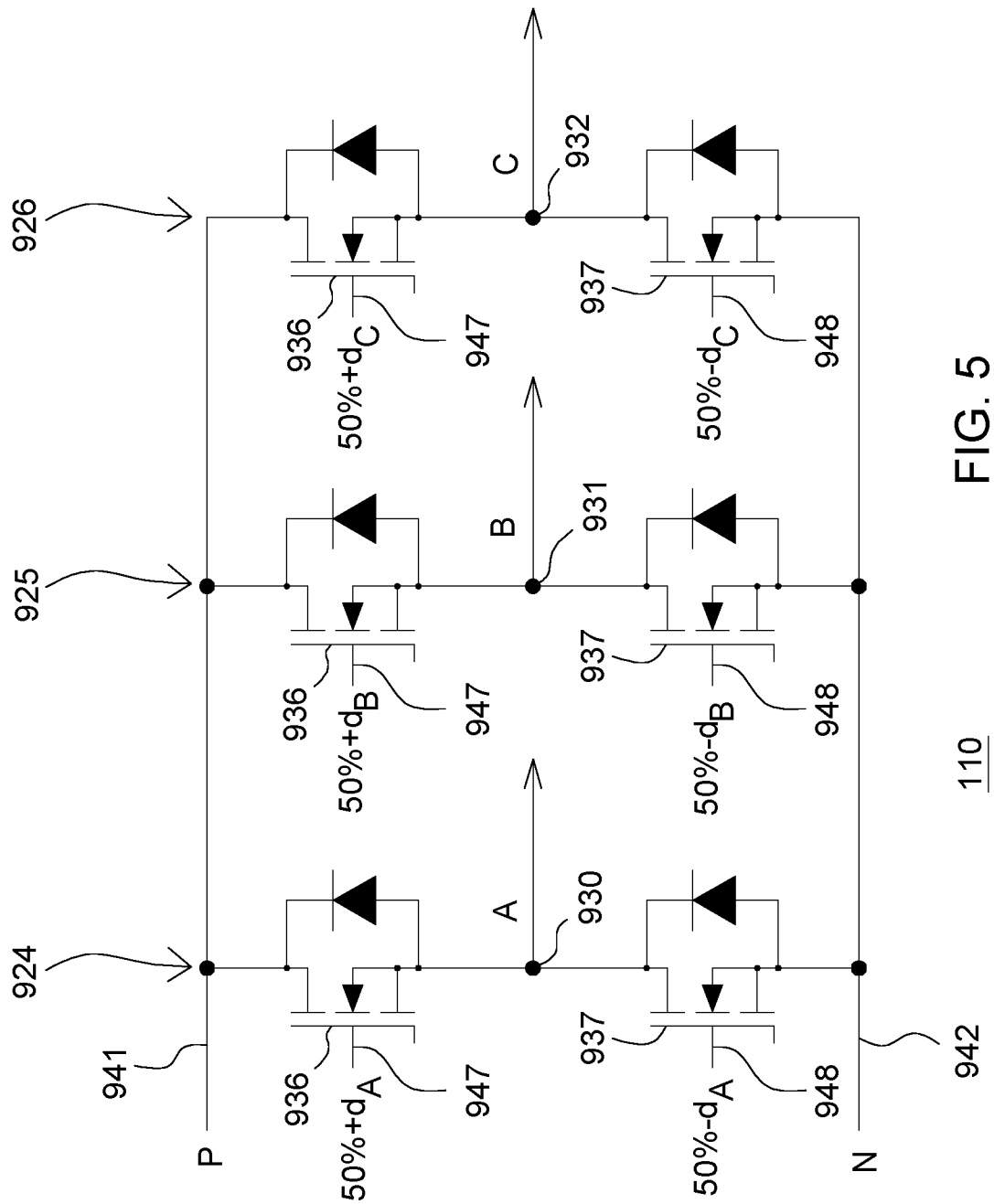
FIG. 5 is a schematic of one embodiment of a primary converter of a DC-to-DC converter that illustrates a possible variation of the duty cycle from a baseline duty cycle (e.g., of approximately 50 percent).

Under a second technique, as illustrated in FIG. 5, the duty cycle adjustment, by the duty cycle control module 93 or duty cycle adjuster 514, can comprise or entail decreasing the duty-cycle of the low-side switch below approximately 50 percent duty cycle (e.g., 50%–dB), while simultaneously increasing the duty cycle of the high-side switch above approximately 50 percent duty cycle (e.g., 50%+dB) for a corresponding phase (e.g., phase B) of the primary inverter to attenuate any direct current or low frequency current flowing between the primary winding and secondary winding of the transformer (e.g., that would otherwise saturate the transformer magnetic flux (B field component) and degrade thermal performance of maximum power rating of the transformer).

Under a third technique, as illustrated in FIG. 5, the duty cycle adjustment, by the duty cycle control module 93 or duty cycle adjuster 514, can comprise or entail decreasing the duty-cycle of the low-side switch below approximately 50 percent duty cycle (e.g., 50%–dA), while simultaneously increasing the duty cycle of the high-side switch above approximately 50 percent duty cycle (e.g., 50%+dA) for a corresponding phase (e.g., phase C) of the primary inverter to attenuate any direct current or low frequency current flowing between the primary winding and secondary winding of the transformer (e.g., that would otherwise saturate the transformer magnetic flux (B field component) and degrade thermal performance of maximum power rating of the transformer).

Under a fourth technique, the duty cycle adjustment, by the duty cycle control module 93 or duty cycle adjuster 514, comprises adjusting the duty cycle for a first pair of switches (e.g., pair of a low-side switch and a high-side switch) of a corresponding first phase of the primary converter on a time-division multiplex-access basis with respect to a second pair of switches for a corresponding second phase of the primary converter and with respect to a third pair of switches for a third phase of the primary converter.

Under a fifth technique, the duty cycle adjustment, by the duty cycle control module 93 or duty cycle adjuster 514, comprises adjusting the duty cycle for a first pair of switches of a corresponding first phase of the primary converter on a time-division multiplex basis with respect to a second pair of switches for a corresponding second phase of the primary converter and with respect to a third pair of switches for a third phase of the primary converter.

Under a sixth technique, each duty cycle adjustment, by the duty cycle control module 93 or duty cycle adjuster 514, is provided to a respective pair of switches during a respective time slot among successive time slots that are provided in a recurring rotational sequence (e.g., on a round robin basis) that provides a control signal to the control terminal (70, 947, 948) of each switch with a minimal frequency of once per period of the recurring rotational sequence.

Under a seventh technique, alone or in conjunction with one or more successive duty cycle adjustments applied on a time-division-multiplex basis to the control terminals (e.g., gates or bases, 70, 947, 948) of the primary switches of the primary converter (and optionally to the control terminals (70, 947, 948) of the secondary switches of the secondary converter, the respective time slot has a duration or interval of approximately 10 microseconds.

Under an eighth technique, the sampling frequency of the first controller and the second controller is 1/N of the DC-to-DC converter switching frequency, where N is the number of AC phases of the converter. At every sampling period based on the switching frequency divided by N, the proposed time modulation scheme will provide a phase-specific duty cycle sequence (e.g., targeted duty cycle adjustments dA, dB and dC for phase A, B and C, respectively) based on the calculated line-to-line, duty cycle adjustments d1, d2, and d3, which is derived from a smoothed waveform representing a time integral of estimated voltage errors (e.g., line-line voltage errors) for various combinations or permutations of two phases. Accordingly, the duty cycle sequence or the underlying estimated voltage errors, or both are compatible with oversampling and/or interpolation of data samples. Based on the generated duty cycle sequence, the phase specific duty-cycle adjustment can be oversampled, interpolated to update at a frequency of once per switching period, rather than switching frequency divided by N. Each line-to-line duty cycle adjustment is mapped, converted or translated to a phase specific duty cycle for each phase of the converter that can be applied by the driver (98, 902) to the semiconductor switches, as a series or sequence of time slots that are updated at the switching frequency. In other words, to improve the PWM resolution of the control signals generated by the driver (98, 902), the time-division multiplex or time modulation can be used. Instead of adjusting the phase-based duty cycle once per controller period of the controllers (405, 511), the electronic data processor 32 or controller 38 can adjust the phase-based duty cycle multiple times per each control period, consistent with oversampling or enhanced data processing (e.g., interpolation of data). The above time modulation scheme is well suited for improving the resolution of the duty cycle adjustment, and thus, an enhanced DC compensation performance could be achieved to reduce potential saturation of the transformer (14, 114, 414).

Figure 6:
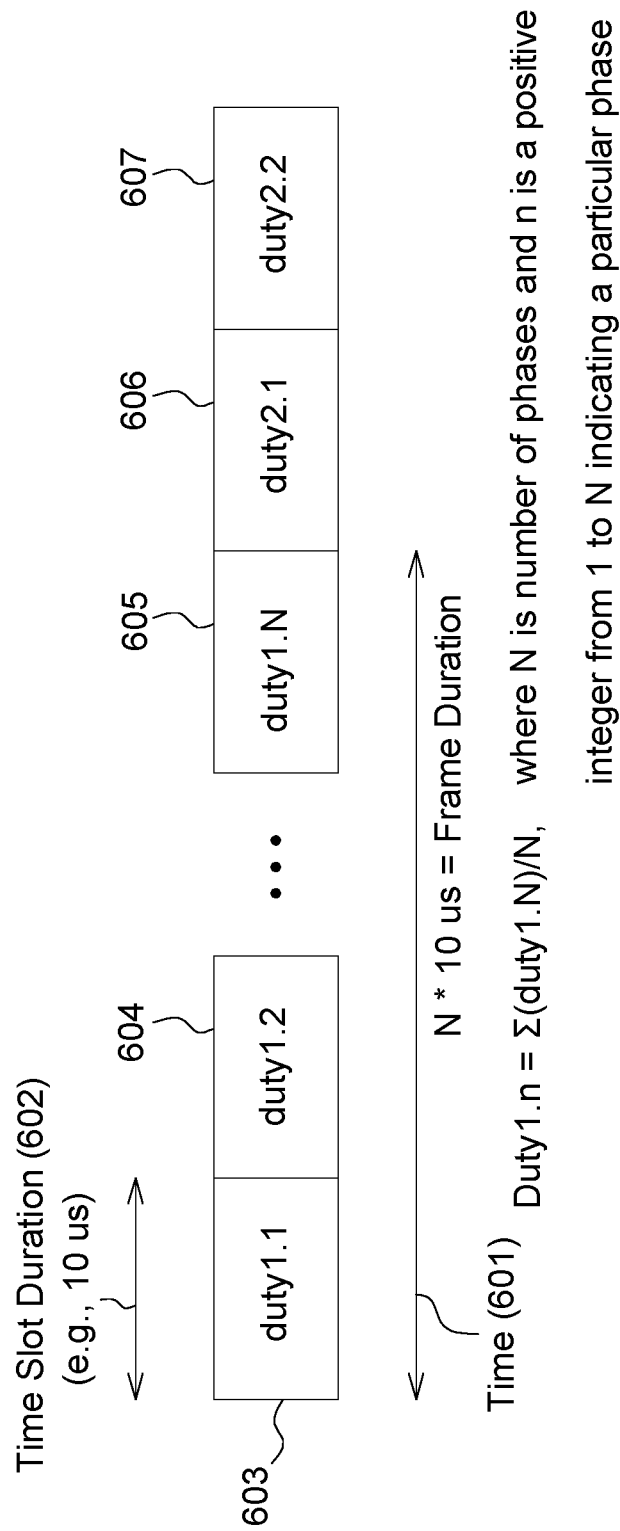
FIG. 6 shows a sequence of duty cycle updates in respective time slots for control of a possible variation of the duty cycle from a baseline duty cycle (e.g., of approximately 50 percent).

FIG. 6 shows a sequence of duty cycle updates in respective time slots (603, 604, 605, 606, 607) for control of a possible variation of the duty cycle from a baseline duty cycle (e.g., of approximately 50 percent). The horizontal axis indicates time (601). Each time slot has a uniform duration, such as 10 microseconds. The time slot duration 602 multiplied by the number of phases, N, or the number of switches, indicate the frame duration. As illustrated, the frame duration equals N multiplied by 10 microseconds. Here, N is a positive whole number equal to or greater than one, such as three for a three-phase DC-to-DC converter (411). The duty cycle adjustment can be defined by Duty $1 \cdot n = \Sigma \text{duty} 1 \cdot n / N$, where N is the number of phases and n is a positive whole number or integer indicating a particular phase, among the phases.

The controller (38, 920), electronic data processor 32, or duty-cycle adjuster 514 can assign duty cycle updates to one or more time slots in accordance with various techniques, which may be applied separately or cumulatively.

Under a first technique, the controller (38, 920), electronic data processor 32, or duty-cycle adjuster 514 is configured to assign duty cycle updates (e.g., dA, dB, dC), via the driver (98, 902), to one phase (e.g., phase A, phase B, or phase C) per time slot (603, 604, 605, 606, 607).

Under a second technique, where a minimum time slot duration is inversely proportional to the maximum clock rate of the electronic data processor, such that a 100 MHz clock rate corresponds to a 10 nanosecond minimum time slot duration.

Under a third technique, where a time slot duration is proportional to the period corresponding to switching frequency or corresponding to a frequency of equal to or greater than two times the sampling period (e.g., switching frequency/N, where N is the number of phases of the converter) of the first controller 405 and/or the second controller 511.

Under a fourth technique, the controller (38, 920), electronic data processor 32, or duty-cycle adjuster 514 is configured to assign a duty cycle adjustment (e.g., mirror positive and negative values of the same duty cycle adjustment, which can be specified by a single absolute value of the duty cycle adjustment) to each phase (e.g., phase A, phase B, phase C), such as an high-side switch and a low-side switch of the same phase, per time slot.

Under a fifth technique, the controller (38, 920), electronic data processor 32, or duty-cycle adjuster module 514 is configured to assign duty cycle updates, via the driver (98, 902), to one phase per two time slots, and to one semiconductor switch per each time slot.

Under a sixth technique, an electronic controller, electronic data processor 32 or duty-cycle adjuster module 514 is configured to determine duty cycle adjustments based on oversampling (e.g., enhanced data processing with interpolation) of smoothed or integrated representation of the first estimated line-to-line DC offset voltage, the second estimated line-to-line DC offset voltage, and the third estimated line-to-line DC offset voltage.

In some DC-DC converters, a low-frequency alternating current component, or a near DC frequency component, or a DC offset or line-to-line DC error voltage, may lead to transformer saturation in the absence of compensation. For example, unbalanced deadtime in the semiconductor switches, differences in gate driver (98, 902) propagation delays to different semiconductor switches, and different device tolerances for semiconductor voltage drops (e.g., drain-source MOSFET voltage drop or emitter-collector voltage drop) can potentially contribute to an unwanted DC offset or near DC signal components at the alternating-current nodes of the primary converter (e.g., primary bridge) and the secondary converter (e.g., secondary side bridge). Consequently, the unwanted DC offset and/or near DC signal components induce a corresponding transformer magnetizing current that reduces the efficiency and power handling of the transformer. If the equivalent series resistance (ESR) of the primary winding and/or secondary winding is sufficiently low, the magnetizing current can arise to a material level and require compensation even for a low DC offset voltage The DC-to-DC converter with thermal management is well-suited for compensating for the unwanted DC offset (and attendant magnetizing current) and attenuating the DC offset by changing the duty-cycle, via the driver (e.g., 98, 902), of the semiconductor switches based on measurements of alternating current nodes, such as electrical measurements (e.g., voltage or current) of the primary winding or secondary winding (e.g., or its or their taps) of the transformer. The DC-to-DC converter can cancel the DC offset current by dynamically and actively changing the duty-cycle of the switches in a temporally responsive manner (e.g., with potentially improved temporal modulation resolution (pulse width modulation resolution) of the driver (e.g., 98, 902) resulting from the oversampling of the smoothed or integrated DC voltage offset). The DC-DC converter can be configured with high resolution duty cycle adjustment to inject a counter DC offset voltage to the transformer to cancel, attenuate, or reduce the observed DC offset with potentially improved compensation performance.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. A dual-active-bridge converter comprising:
   a primary converter having a plurality of primary switch pairs that operate at different phases or phase offsets with respect to each other; each primary switch pair comprising a first switched terminal of low-side semiconductor switch coupled to a corresponding second switched terminal of high-side semiconductor switch at a primary alternating current node, each primary switch pair comprising the low-side semiconductor switch having a second switched terminal coupled to one terminal of a primary direct current bus; the high-side semiconductor switch having a first switched terminal coupled to another terminal of the primary direct current bus;
   a secondary converter having a plurality of secondary switch pairs that operate at different phases or phase offsets with respect to each other; each secondary switch pair comprising a first switched terminal of low-side semiconductor switch coupled to a corresponding second switched terminal of high-side semiconductor switch at an secondary alternating current node, each secondary switch pair comprising the low-side semiconductor switch having a second switched terminal coupled to one terminal of a secondary direct current bus; the high-side semiconductor switch having a first switched terminal coupled to another terminal of the secondary direct current bus;
   a first DC offset detector to measure a first observed DC offset line-to-line voltage, associated with the primary alternating current nodes, between a first respective phase and a second respective phase;
   a second DC offset detector to measure a second observed DC offset line-to-line voltage, associated with the primary alternating current nodes, between a third respective phase and the second respective phase;
   an estimator or summer for determining or estimating a third estimated line-to-line DC offset voltage based upon a difference between the first observed line-to-line DC offset voltage and the second line-line DC offset voltage;
   a transformer coupled between the primary alternating current node and the secondary alternating current node; and
   an electronic controller configured to provide control signals to the control terminals of the semiconductor switches of the primary converter and the secondary converter based on a commanded current or target output current; the electronic controller configured to adjust the duty cycle through a duty cycle adjustment, between a respective pairs of semiconductor switches of the primary converter and second converter based on reducing or minimizing one or more of the first estimated line-to-line DC offset voltage, the second estimated line-to-line DC offset voltage, and the third estimated line-to-line DC offset voltage.

2. The dual active bridge converter according to claim 1 further comprising:
   the electronic controller being configured to determine duty-cycle adjustments for each phase based on oversampling of a smoothed or integrated representation of the first estimated line-to-line DC offset voltage, the second estimated line-to-line DC offset voltage, and the third estimated line-to-line DC offset voltage.

3. The dual active bridge converter according to claim 1 further comprises:
   the electronic controller being configured to determine duty-cycle adjustments for each phase based on oversampling at a supplemental rate of a smoothed or integrated representation of the first estimated line-to-line DC offset voltage, the second estimated line-to-line DC offset voltage, and the third estimated line-to-line DC offset voltage provided at a preliminary rate of one or more proportional integral controller, where the supplemental rate is greater than the preliminary rate.

4. The dual active bridge converter according to claim 1 wherein the first DC offset detector comprises:
   a first low-pass filter configured to receive the first alternating current voltage at a first alternating current node for a first respective phase;
   a second low-pass filter configured to receive the second alternating current voltage a second alternating current node for a second respective phase;
   a differential amplifier coupled to the outputs of the first low-pass filter and the second low-pass filter, the differential amplifier providing a first line-to-line DC offset voltage.

5. The dual active bridge converter according to claim 4 wherein the second DC offset detector comprises:
   a first low-pass filter configured to receive the second alternating current voltage at a second alternating current node for a second respective phase;
   a second low-pass filter configured to receive the third alternating current voltage a third alternating current node for a third respective phase;

a differential amplifier coupled to the outputs of the first low-pass filter and the second low-pass filter, the differential amplifier providing the second line-to-line DC offset voltage.

6. The dual active bridge converter according to claim 1 wherein the controller comprises a duty-cycle control module; the duty-cycle module comprising:
- a first summer for receiving a negative inputs of the first line-to-line DC offset voltage and the target zero line-to-line DC offset voltage;
- a second summer for receiving a negative inputs of the second line-to-line DC offset voltage and the target zero line-to-line DC offset voltage;
- a first controller configured to receive an output of the first summer;
- a second controller configured to receive an output of the second summer;
- a time modulation and duty-cycle assignment module configured to provide a dynamic duty cycle adjustment in a corresponding time slot on a time-division multiplex basis for each corresponding phase of the primary converter that differs from an approximately fifty percent duty cycle.

7. The dual active bridge converter according to claim 1 wherein the duty-cycle adjustment comprises decreasing the duty cycle of the low-side switch below approximately 50 percent duty cycle, while simultaneously increasing the duty cycle of the high-side switch above approximately 50 percent duty cycle for a corresponding phase of the primary inverter to attenuate any direct current or low frequency alternating current flowing between the primary winding and secondary winding of the transformer.

8. The dual active bridge converter according to claim 1 wherein the duty-cycle adjustment comprises adjusting the duty cycle for a first pair of switches of a corresponding first phase of the primary converter on a time division multiplex basis with respect to a second pair of switches for a corresponding second phase of the primary converter and with respect to a third pair of switches for a third phase of the primary converter.

9. The dual active bridge converter according to claim 1 wherein the duty-cycle adjustment comprises adjusting the duty cycle for a first pair of switches of a corresponding first phase of the primary converter on a time division multiplex basis with respect to a second pair of switches for a corresponding second phase of the primary converter and with respect to a third pair of switches for a third phase of the primary converter.

10. The dual active bridge converter according to claim 1 wherein each duty cycle adjustment is provided to a respective pair of switches during a respective time slot among successive time slots that are provided in a recurring rotational sequence that provides a control signal to the control terminal of each switch with a minimum time slot duration that is based on the clock speed of the electronic data processor.

11. The dual active bridge converter according to claim 10 wherein the respective time slot has a duration or interval within a range of approximately 10 nanoseconds to approximately 10 microseconds and modulates the fundamental switching frequency pursuant to pulse width modulation.

* * * * *